United States Patent
Leber et al.

[19]

[11] Patent Number: 5,819,587
[45] Date of Patent: Oct. 13, 1998

[54] MULTI-RATIO REVERSING POWER SHIFTABLE GEAR

[75] Inventors: Fritz Leber; Wolfgang Rebholz, both of Friedrichshafen, Germany

[73] Assignee: ZF Friedrichshafen AG, Friedrichshafen, Germany

[21] Appl. No.: 737,258

[22] PCT Filed: May 6, 1995

[86] PCT No.: PCT/EP95/01721

§ 371 Date: Nov. 12, 1996

§ 102(e) Date: Nov. 12, 1996

[87] PCT Pub. No.: WO95/31654

PCT Pub. Date: Nov. 23, 1995

[30] Foreign Application Priority Data

May 13, 1994 [DE] Germany ............... 44 16 930.2

[51] Int. Cl.⁶ ................................... F16H 3/093
[52] U.S. Cl. ................................... 74/331; 74/333
[58] Field of Search ............... 74/333, 331, 325

[56] References Cited

U.S. PATENT DOCUMENTS

| | | | |
|---|---|---|---|
| 4,823,639 | 4/1989 | Krause et al. ................. | 74/333 |
| 5,085,092 | 2/1992 | Koga .......................... | 74/333 |
| 5,249,475 | 10/1993 | McAskill ...................... | 74/331 |
| 5,388,450 | 2/1995 | Hurth .......................... | 74/331 |
| 5,471,892 | 12/1995 | Sherman ....................... | 74/331 |

FOREIGN PATENT DOCUMENTS

| | | |
|---|---|---|
| 11 29 838 | 5/1962 | Germany . |
| 25 35 700 | 2/1977 | Germany . |
| 2 111 612 | 7/1983 | United Kingdom . |

*Primary Examiner*—Charles A. Marmor
*Assistant Examiner*—Sherry Lynn Estremsky
*Attorney, Agent, or Firm*—Davis and Bujold

[57] ABSTRACT

A multi ratio reversing powershiftable transmission having an input shaft, an output shaft, a plurality of countershafts, a drive wheel set, a distribution wheel set and a driven wheel set. The set of drive wheels includes a driven idler gear on each countershaft which can be optionally non-rotatably connected with the contershaft to cause a change of gear and direction of the transmission. The set of distribution wheels consist of at least one fixed gear on each countershaft for commutating rotation between communicating countershafts and the fixed gears of the set of driven wheels which in turn drive the output shaft.

9 Claims, 6 Drawing Sheets

MULTI-RATIO REVERSING POWER SHIFTABLE GEAR

BACKGROUND OF THE INVENTION

In the building machines used at present, gears are used which can essentially be divided into two groups. Characteristic of one group is that on the powershift gear is a front mounted hydrostatic driving unit. In this gear, the speed and torque of the splitter group are adapted by hydraulic or electrohydraulic controls.

The predominant number of gears used belongs to the other group of the powershiftable gear with front-mounted, hydrodynamic torque converters. By means of said driving unit, it is possible to obtain a continuous and automatic torque multiplication with increasing working resistance of the motor vehicle such as a building machine. Here gear input torques can be produced which substantially correspond to the triple value of the engine torque. This is significant, since differently from what is the case in the passenger car, the work is done with the gear or converter. In a loader, for example, the shovel is pushed into absorbing ground. The filling is broken up and lifted. For loading the vehicle is reversed, the shovel is further lifted and unloaded. The torque conversion is a great advantage precisely at low speeds and great speed differences between the input and output.

The converter can be complemented by a converter bridge clutch. By means of said clutch it is possible to obtain a considerable reduction of consumption within the gears in the range of higher speeds.

The power flow in the individual gears is produced by a combination of hydraulically shiftable clutches. Among other things, said clutches must be powershiftable for reversing and, therefore, absorb much energy. The design of the housing or arrangement of the shafts of the gear must be adapted to a specific use. Typical cases of use for a reversing gear are dump carts, loaders, excavator loaders and lift trucks, but also in vehicles that must be operated on the street such as motor cranes. Depending on the type of vehicle, a specific center distance between the input and output shafts of the gear is required. Long center distances are to be maintained, for example, when the angle of inflection of universal shafts must be kept small. In this case, the reversing gear assumes an additional function as a transfer gear.

In lift trucks, the reversing gear has only one output shaft. Due to the spatial conditions a lesser center distance is needed.

In most cases, at least one power take off driven in dependence on the engine speed, for example, for the hydraulic system of the mobile machine is required. Together with the power take off, a lubricant and shift pump is also provided which likewise is driven depending on the engine speed.

Depending on the type of construction of the vehicle, the tasks to be performed by a reversing gear are very varied.

DESCRIPTION OF THE RELATED ART

DE-A 11 29 838 has disclosed a reversing gear which stands out by a small axial length. A fixed pinion is upon an input shaft which is constantly meshed with fixed pinions upon a reversing shaft and a countershaft. All loose pinions are upon one side of the gear and permanently meshed with each other. A respective friction clutch is situated between the loose and fixed pinions. In this known reversing gear, the practical construction of the friction clutches, particularly the arrangement of the sets of plates, the mounting of the loose pinions upon the countershafts and also the indirect support of the countershaft itself on the side of the loose pinions turns out to be relatively expensive.

DE-A 25 35 700 has disclosed a reversing gear in which the friction clutches are designed as double clutches. In this gear, it is possible to obtain a relatively high number of gears, but a large installation space is needed in an axial direction, since up to four gears and one double clutch are to be lodged on one countershaft.

SUMMARY OF THE INVENTION

The problem on which this invention is based is to provide a reversing powershiftable gear with a small axial length which allows different variants with fundamentally the same design as to the possible number of gears and the required center distances.

One possible solution of the stated problem consists in that a single clutch is situated upon each countershaft, that one fixed gear and idler gears in constant mesh therewith form a set of drive wheels, that one fixed gear situated upon the countershaft with two idler gears are in constant mesh and form a chain of driven wheels, and that the countershafts are interconnected by a fixed gear and one idler gear which form a set of distribution wheels. Since only one clutch is provided for each countershaft, an axially short design results even in the case of a six-ratio reversing gear. Because of their small length, the countershafts have little flexure. They can be supported in the gear housing on both sides on roller bearings. The used idler gears have a single meshing; they are not used as intermediate gears. By virtue of the proposed design of the countershafts it is likewise possible to obtain long and short center distances.

It has proved advantageous if the fixed gear of the chain of driven wheels, situated upon the countershaft, is opposite to an idler gear of the set of distribution wheels. The fixed gear upon the countershaft, which can also be the output shaft of the gear, has a relatively large diameter. It is preferably helically cut. A large bearing base is available for support. Based on the load and speed conditions, it is advantageous if the clutch for the third gear is coordinated with the idler gear of the set of distribution wheels.

To connect the pinions of the set of distribution wheels, taking into account the requirement of small axial length of the gear, it has proved very advantageous if a clutch, used as a directional and/or a gearshift clutch with one idler gear of the set of drive wheels and two fixed gears of the set of distribution wheels, is situated upon the countershaft. Disregarding the converter housing, the axial length of the gear is thus determined by the single clutch and one idler and two fixed gears.

In another solution of the problem on which the invention is based, the chain of driven wheels is formed by idler gears. For this purpose, a single clutch is situated upon each countershaft, one fixed gear and idler gears in constant mesh therewith form a set of drive wheels, the idler gear situated upon the countershaft is in constant mesh with two idler gears and the countershafts are interconnected by fixed gears which form a set of distribution wheels. Due to the use of one idler gear, the expert is to a great extent free with the spatial arrangement of the countershafts of the gear.

A convenient embodiment of the reversing gear has the input shafts situated concentrically to each other. One input shaft designed, as a hollow shaft, carries the fixed gear of the set of drive wheels.

Based on the load, speed and spatial conditions, it has proved very advantageous that with the idler gears, which are in constant mesh with the fixed gear, clutches for changing the first and second gear be coordinated.

Other features, essential to the invention and the advantages resulting therefrom, are to be understood from the description that follows of several embodiments of a powershiftable reversing gear.

DESCRIPTION OF THE PREFERRED EMBODIMENTS

Figure 1:
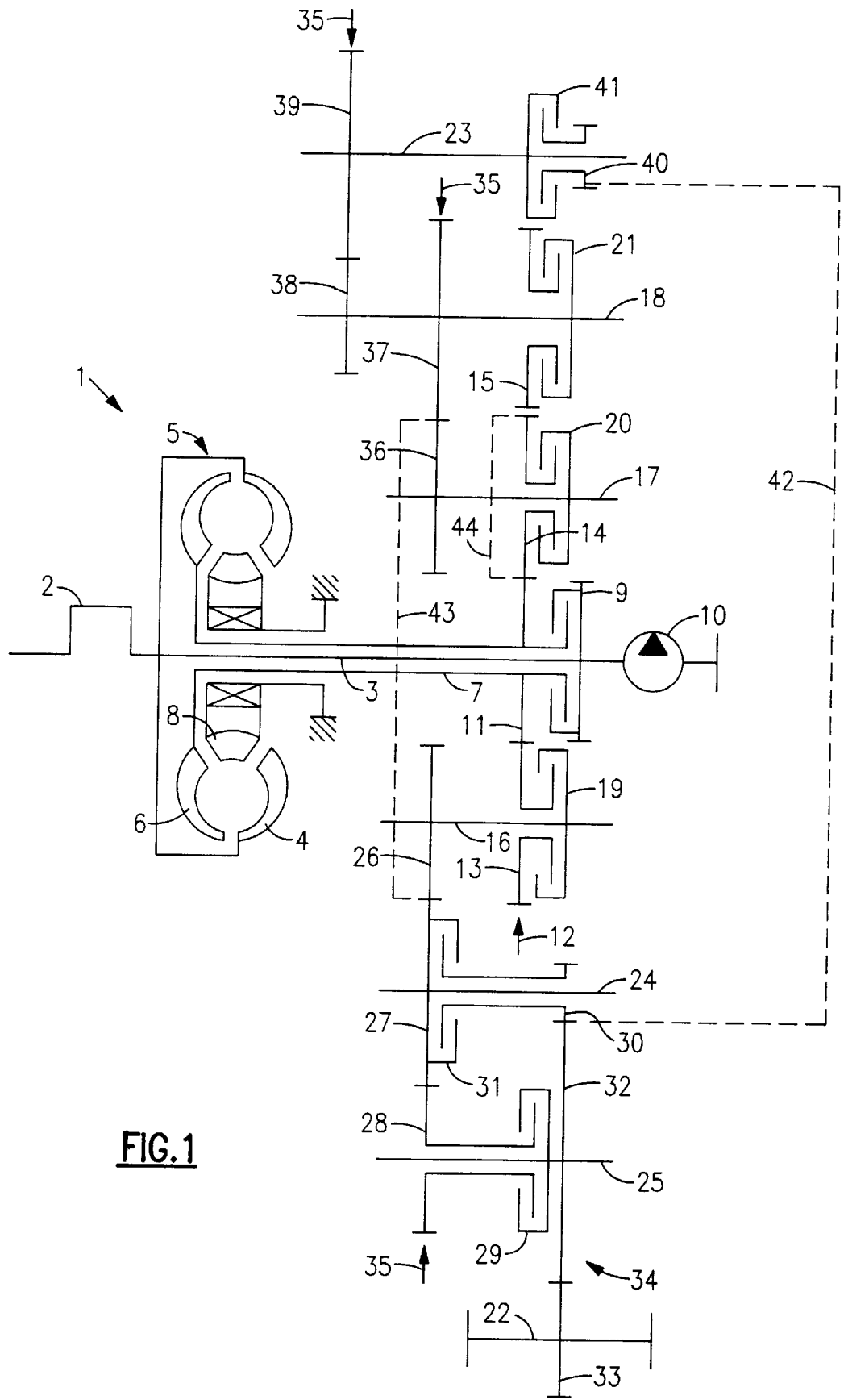
FIG. 1 is a gear diagram of a reversing gear having six forward and three reverse gears and a long center distance.

A gear diagram of a powershiftable reversing gear 1 is reproduced in FIG. 1. This is a reversing gear with a maximum of six forward and three reversing gears. A diagrammatically indicated engine 2 drives an input shaft 3 of the reversing gear. The input shaft 3 is non-rotatably connected with an impeller 4 of a hydrodynamic torque converter 5. A turbine wheel 6 of the hydrodynamic torque converter transfers the input to a hollow shaft 7 which is concentric with the input shaft 3.

The hydrodynamic torque converter 5 is completed by one stator 8 which is supported on a free wheel. The operation range of the hydrodynamic torque converter is limited by a converter bridge clutch 9. In a conventional manner, the converter bridge clutch 9 is closed on the through drive point so that the impeller 4 is mechanically connected with the turbine wheel 6.

The pump 10, appearing to the right in the drawing, is a lubricant pump such as a gear pump driven by the input shaft 3.

A fixed gear 11, which forms the input gear of a set of drive wheels 12, is non-rotatably fitted upon the hollow shaft 7. Idler gears 13, 14 and 15 belong to said set of drive wheels 12. The fixed gear 11 is in constant mesh with said idler gears 13, 14 and 15. The idler gears 13, 14 and 15 are each supported on a countershaft 16, 17 and 18.

A clutch 19 is coordinated with the idler gear 13, a clutch 20 with the idler gear 14, and a clutch 21 with the idler gear 15.

When the clutch 19 is engaged, the idler gear 13 is non-rotatably connected with the countershaft 16. The idler gear 14 is connected with the countershaft 17 when the clutch 20 is actuated. If the clutch 21 is engaged, a non-rotatable connection exists between the idler gear 15 and the countershaft 18. The clutches 19, 20 and 21 allow a reversal of the direction of rotation of an output shaft 22 of the reversing gear 1. For this reason, the clutches 19, 20 and 21 are also designated as directional clutches.

Together with the countershafts 16, 17 and 18, the same as the output shaft 22, the reversing gear has added countershafts 23, 24 and 25.

A fixed gear 26 is situated, together with the idler gear 13, upon the countershaft 16. The fixed gear 26 is in constant mesh with a fixed gear 27 of the countershaft 24. The fixed gear 27 can assume the function of an intermediate gear. An idler gear 28, which is meshed with the fixed gear 27 of the countershaft 24, is supported upon the countershaft 25. One clutch 29 is coordinated with the idler gear 28 by which the idler gear 28 can be non-rotatably connected with the countershaft 25.

An idler gear 30 is rotatably mounted on the countershaft 24. The idler gear 30 can be non-rotatably attached to the fixed gear 27 by means of another clutch 31.

When the clutch 31 is engaged, the input flows via the idler gear 30 to a fixed gear 32 of the countershaft 25.

A fixed gear 33, which is in constant driving connection with the fixed gear 32 of the countershaft 25, is situated upon the output shaft 22 of the reversing gear.

The idler gear 30 and the fixed gears 32 and 33 form a chain of driven wheels 34.

The fixed gears 26, 27 and the hollow gear 28 belong to a set of distribution wheels 35 which is completed by another fixed gear 36 of the countershaft 17, two fixed gears 37 and 38 of the countershaft 18 and one fixed gear 30 of the countershaft 23.

An idler gear 40, which can be non-rotatably connected by a clutch 41 with the countershaft 23, is on the countershaft 23. The idler gear 40 is in constant mesh, which is indicated by a dotted line 42, with the fixed gear 32. The idler gear 40 thus belongs to the chain of driven wheels 34.

The fixed gear 27 is meshed, which is made clear by the dotted line 43, with the fixed gear 37 of the set of distribution wheels 35. The idler gear 15 of the countershaft 18 meshes with the fixed gear 11, which is apparent from the dotted line 44.

The clutches 41, 31 and 29, together with the directional clutches mentioned, serve for gear change and are designated as gear clutches. For each gear one directional and one gear clutch are engaged.

From the hitherto described construction of the reversing gear 1, it results that the countershafts 16 and 17, each have one idler gear 13 and 14 of the set of drive wheels 12 and one fixed gear 26 and 36 of the set of distribution wheels 35.

The clutch 21 is both a directional and a gearshift clutch. The fixed gears 37 and 38 of the set of distribution wheels, together with the idler gear 15 of the set of driving wheels 12, are supported upon the countershaft. The speed and the direction of rotation of all pinions of the set of distribution wheels 35 are defined when one of the directional clutches 19, 20 and 21 is actuated.

The countershafts 23, 24 and 25 upon which the clutches 41, 31 and 29 (gear clutches), respectively, are situated accommodate one fixed gear 39, 27 and one idler gear 28 of the set of distribution wheels 35, the same as one idler gear 40, 30 and one fixed gear 32 of the chain of driven wheels 34. If the reversing gear 1 is operated in a four-gear version, the following ratios apply:

| gear | engaged clutches |
| --- | --- |
| 1 | 19 and 41 |
| 2 | 19 and 31 |
| 3 | 19 and 29 |
| 4 | 21 and 29 |
| 1R | 20 and 41 |
| 2R | 20 and 31 |
| 3R | 20 and 29 |

For a six-gear version where the clutches 19 and 21 are used as so-called split clutches, the following ratios apply:

| gear | engaged clutches |
| --- | --- |
| 1 | 19 and 41 |
| 2 | 21 and 41 |
| 3 | 19 and 31 |
| 4 | 21 and 31 |
| 5 | 19 and 29 |
| 6 | 21 and 20 |
| 1R | 20 and 41 |
| 2R | 20 and 31 |
| 3R | 20 and 29 |

Figure 2:
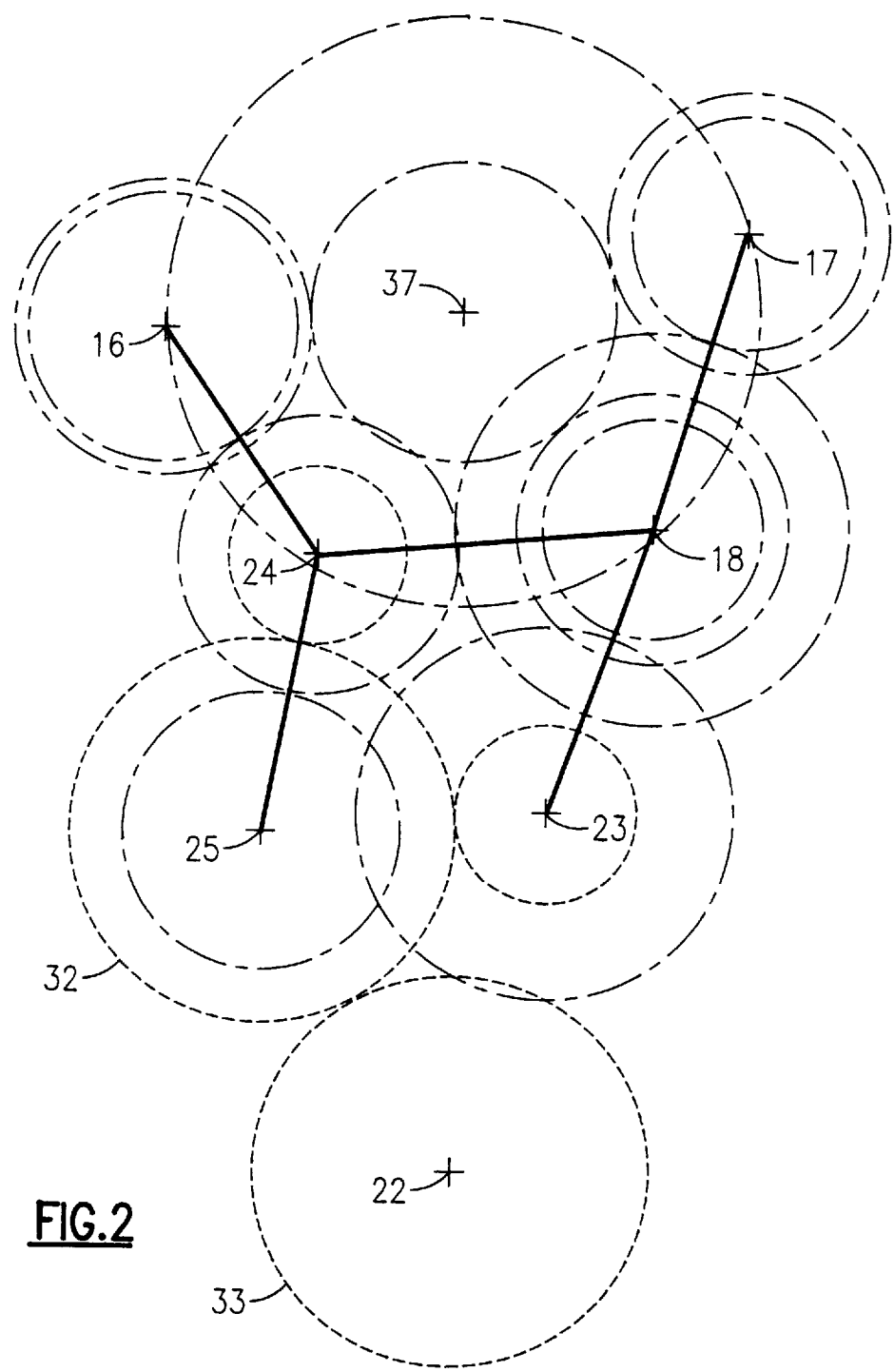
FIG. 2 is a diagrammatic front elevation of the reversing gear of FIG. 1 to illustrate the spatial position of the countershafts and of the fixed and idler gears.

FIG. 2 is to be understood as a schematized front elevation of the reversing gear 1 according to FIG. 1. The reversing gear works with a long center distance. The countershafts 16, 24, 25, 17, 18 and 23 of the set of distribution wheels 35 are interconnected by the thick line (distribution chain). Said distribution chain is broken between the clutch 41, for the first gear (countershaft 23), and the clutch 29 for the third gear (countershaft 25).

Figure 3:
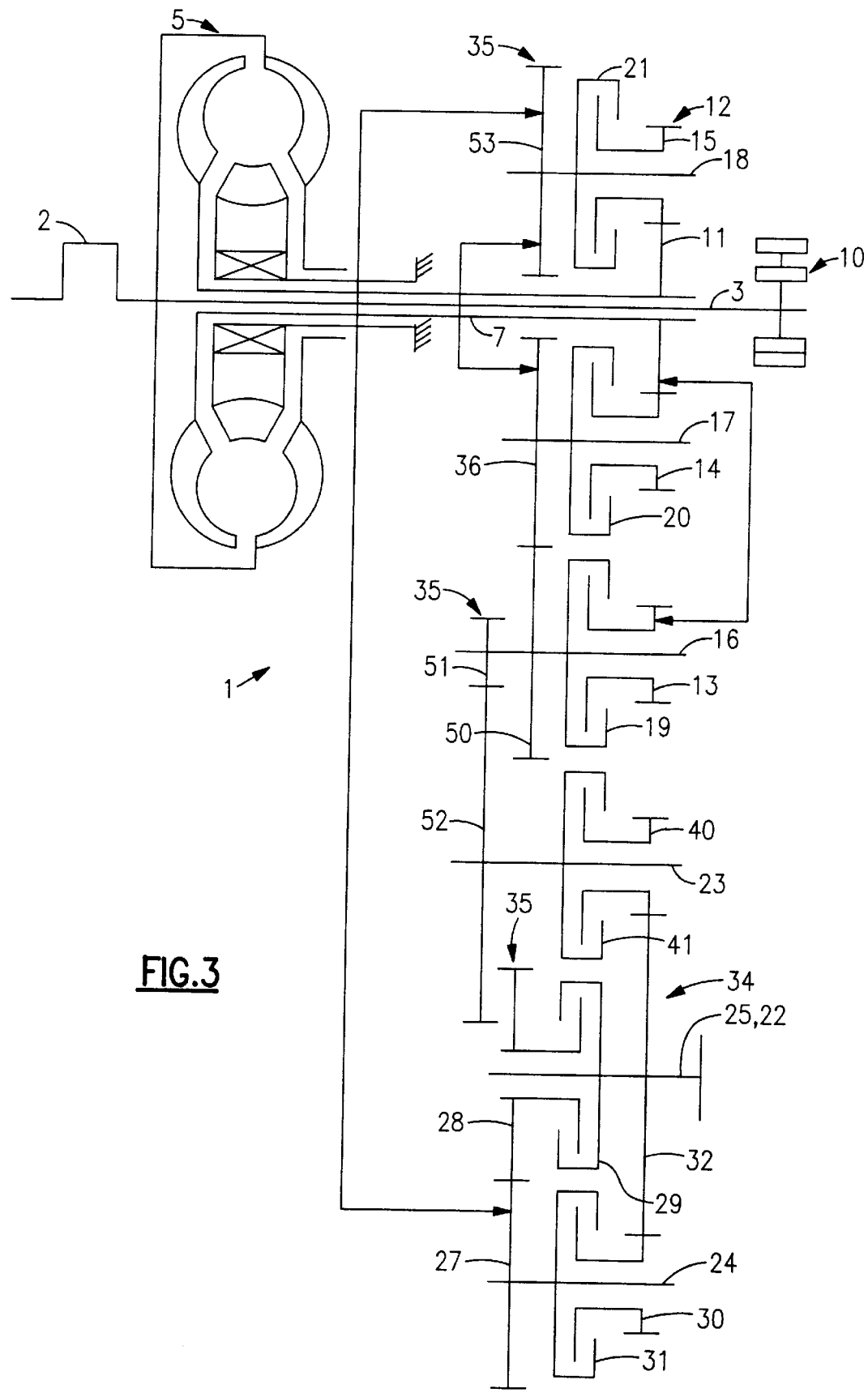
FIG. 3 is a gear diagram of a reversing gear having six forward and three reverse gears and a short center distance.

In FIG. 3, the gear diagram of a reversing gear, having four forward and three reverse gears, is reproduced. It is a reversing gear for short center distances (approximately from 120 to 220 mm) for use in mobile cranes, lift trucks and, preferably, excavator loaders. The reversing gear can also be shown in a six-gear version. The reversing gear reproduced has functional features in common with the reversing gear of FIG. 1 so that similar parts bear the same reference numerals. During the course of the explanation that follows detailed attention will be drawn to existing differences.

The engine 2 drives a hollow shaft 7 of the reversing gear 1 via the hydrodynamic torque converter 5. In this gear, the fixed gear 11 is also connected with the hollow shaft 7. The set of driving wheels 12 is formed by the idler gears 13, 14 and 15, which are supported on the countershafts 16, 17 and 18. The clutch 19 serves as a directional clutch for the forward travel direction. The reverse travel direction is similarly selected with the clutch 20.

The fixed gear 36 of the countershaft 17 meshes with a first fixed gear 50 of the countershaft 16 and another fixed gear 51, of said countershaft 16, is in meshed connection with one fixed gear 52 of the countershaft 23.

The fixed gears 36, 50, 51 and 52 are component parts of the set of distribution wheels 35. In this arrangement, the fixed gears 50 and 51 are functionally similar to the fixed gears 37 and 38 of the countershaft 18 of the reversing gear of FIG. 1. The set of distribution wheels 35 is completed by a fixed gear 53 upon the countershaft 18, the fixed gear 27 of the countershaft 24 and the idler gear 28 upon the countershaft 25 which is, at the same time, the output shaft 22.

The chain of driven wheels 34 is formed by the fixed gear 32 of a large diameter of the countershaft or output shaft 22, the idler gear 30 of the countershaft 24 and the idler gear 40 of the countershaft 23.

The fixed gear 27 of the countershaft 24 is in constant mesh with a fixed gear 53 which is component part of the set of distribution wheels 35. Said fixed gear 53 is non-rotatably connected with the countershaft 18. The fixed gears 36 and 53 are in constant mesh.

The clutches 41, 31, 29 and 21, together with the directional clutches 19 and 20 are provided for gearshifting.

The individual gears are engaged as follows:

| gear | actuated clutches |
| --- | --- |
| 1 | 19 and 41 |
| 2 | 19 and 31 |
| 3 | 19 and 29 |
| 4 | 21 and 29 |
| 1R | 20 and 41 |
| 2R | 20 and 31 |
| 3R | 20 and 29 |

In order that none of the idler gears are used as an intermediate gear and, in particular, in order to prevent a loosely supported intermediate gear upon the countershaft or output shaft 25, 22, the countershafts 23, 16, 17, 18, 24 and 25 or 22 are situated in relation to the input shaft 3 or the hollow shaft 7 so as to be, so to speak, wound around the input.

Figure 4:
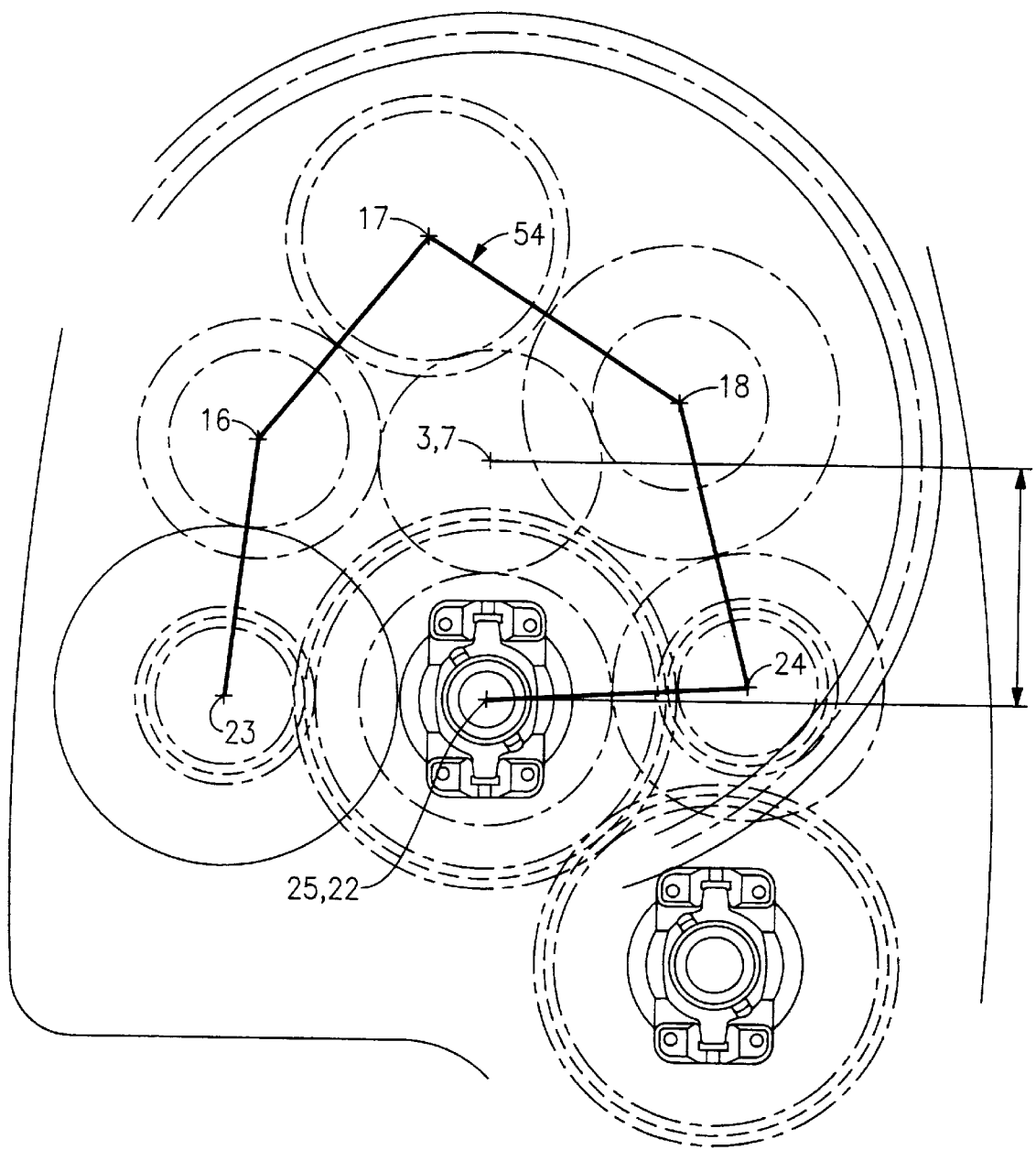
FIG. 4 is a diagrammatic front elevation of the reverse gear of FIG. 3.

This results from the illustration according to FIG. 4 of the schematized front elevation on the gear. The position of the set of distributor wheels is highlighted, in particular, by a thick line 54 of the distribution chain. The countershafts are positioned in relation to the input so that the power flow in said distribution chain is led around the input and interrupted only between the countershafts 23, 25 or 22.

From the drawing, it results that the gear has a compact design with short center distances.

Figure 5:
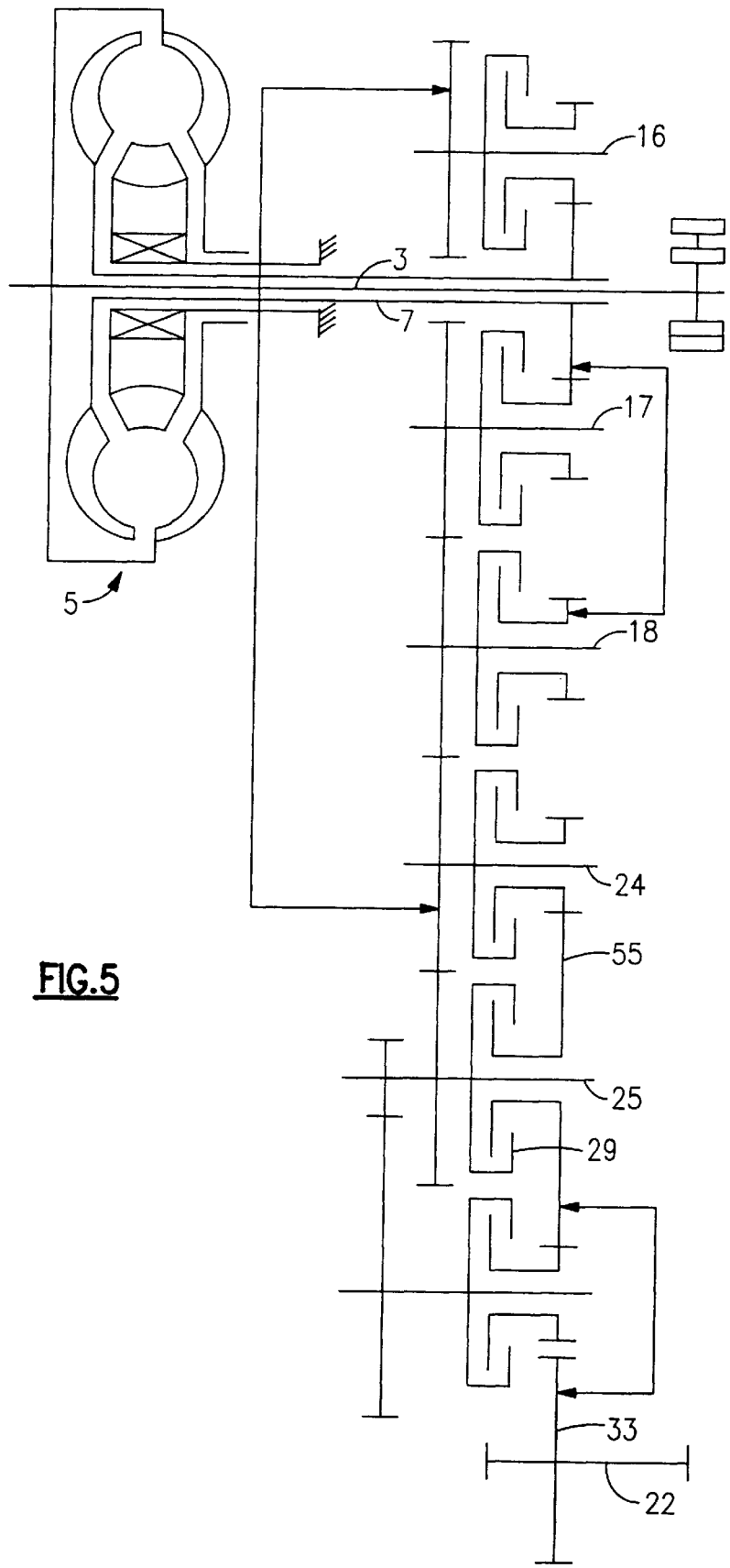
FIG. 5 is a gear diagram of another embodiment of a four-gear reverse gear with a long center distance.

The reversing gear 1, upon which is based the gear diagram of FIG. 5, is a modification both of the gear of FIG. 1 and of the one of FIG. 3. The coincidence with the gear of FIG. 1 exists only insofar as with said gear a longer center distance is also to be realized.

Figure 6:
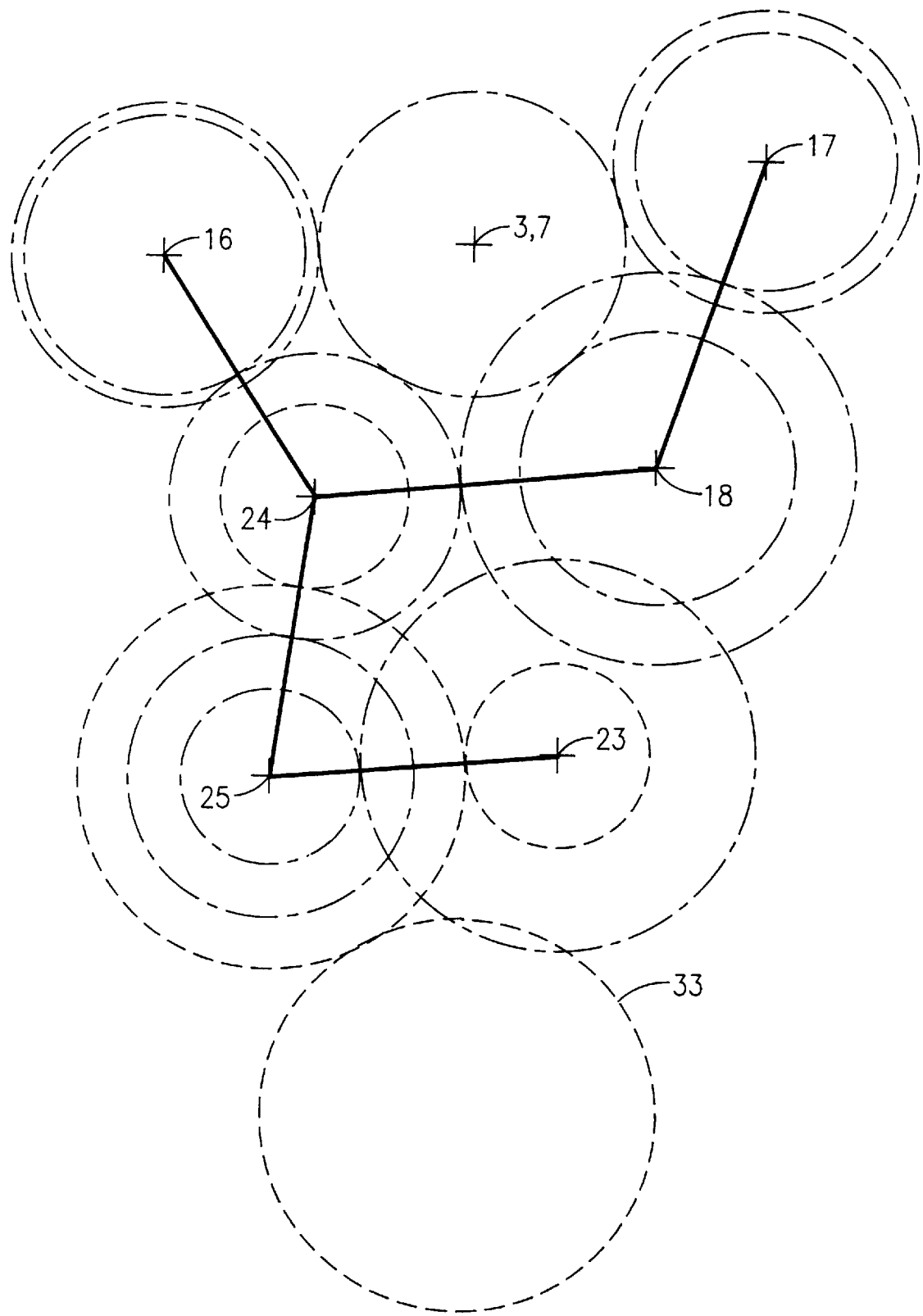
FIG. 6 is a diagrammatic front elevation of the reverse gear of FIG. 5.

The variation of the gear of FIGS. 1 and 3 consists in that it is to be shown, with this construction, that the gear situated upon the countershaft 25, having a relatively large diameter, must not necessarily be a fixed gear. It is basically possible to design this pinion as an idler gear 55 which can be non-rotatably connected by the clutch 29 with the countershaft 25. The idler gear is in constant meshed connection with the fixed gear 33 upon the countershaft 22 of the reversing gear 1. The design of said pinion, as idler an gear 55, is disadvantageous in itself. For the manufacturer opposed to said disadvantage stands the advantage of a greater freedom in the spatial arrangement of the countershafts. The diagrammatic top view of the gear of FIG. 6 shows the possible spatial arrangement of the input and hollow shafts 3, 7 situated concentrically with each other and of the remaining countershafts. The lines which interconnect the set of distributor wheels 35, the distribution chain are, in turn, especially highlighted with a thick line.

| Reference numerals | |
|---|---|
| 1 reversing gear | 30 idler gear |
| 2 engine | 31 clutch |
| 3 input shaft | 32 fixed gear |
| 4 impeller | 33 fixed gear |
| 5 torque converter | 34 chain of driven wheels |
| 6 turbine wheel | 35 set of distribution wheels |
| 7 hollow shaft | |
| 8 stator | 36 fixed gear |
| 9 converter bridge clutch | 37 fixed gear |
| 10 pump | 38 fixed gear |
| 11 fixed gear | 39 fixed gear |
| 12 set of drive wheels | 40 idler gear |
| 13 idler gear | 41 clutch |
| 14 idler gear | 42 line |
| 15 idler gear | 43 line |
| 16 countershaft | 44 line |
| 17 countershaft | 45 — |
| 18 countershaft | 46 — |
| 19 clutch | 47 — |
| 20 clutch | 48 — |
| 21 clutch | 49 — |
| 22 output shaft | 50 fixed gear |
| 23 countershaft | 51 fixed gear |
| 24 countershaft | 52 fixed gear |
| 25 countershaft | 53 fixed gear |
| 26 fixed gear | 54 line (distribution chain) |
| 27 fixed gear | |
| 28 idler gear | 55 idler gear |
| 29 clutch | |

We claim:

1. A multi-ratio reversing powershiftable transmission (1) comprising:

at least one input shaft (3, 7), having a fixed drive gear (11);

a plurality of countershafts (16, 17, 18, 23, 24 and 25), each supporting a single clutch (19, 20, 21, 29, 31 and 41) and an idler gear (13, 14, 15, 40, 30, 28) which can be optionally non-rotatably connected with one of each said countershafts for a change of gear and direction;

a set of drive wheels (12) consisting of said fixed drive gear (11) in constant mesh with more than one of said idler gears;

a set of distribution wheels (35) consisting of a plurality of fixed gears (26, 27, 36, 37, 38 and 39) and one of said idler gears (28) for commutating rotational communication between said countershafts;

a set of driven wheels (34) having at least one fixed driven gear (32) in constant mesh with at least two said idler gears (30, 40) for driving an output shaft.

2. A multi-ratio reversing powershiftable transmission (1) as set forth in claim 1, wherein said one idler gear (28) of said set of distribution wheels (35) is situated upon said countershaft opposite to said one fixed gear (32) of said driven wheels (34).

3. A multi-ratio reversing powershiftable transmission (1) as set forth in claim 1, wherein actuating of said clutch initiates said non-rotatable connection between said one idler gear (28) and respective countershaft of said set of distribution wheels (35) forms a third gear ratio within said multi-ratio reversing powershiftable transmission.

4. A multi-ratio reversing powershiftable transmission (1) as set forth in claim 1, wherein at least one of said clutches (19, 20 or 21) respectively associated with one of said idler gears of said set of drive wheels (12) is used as one of a directional and gearshift clutch.

5. A multi-ratio reversing powershiftable transmission (1) as set forth in claim 4 wherein a pair of fixed gears (37, 38) of said set of distribution wheels are supported on a countershaft corresponding with said at least one directional and gearshift clutch (19, 20, 21), of said set of drive wheels (12).

6. A multi-ratio reversing powershiftable transmission (1) according to claim 1, wherein at least one of said plurality of countershafts supports up to two fixed gears together with one said clutch.

7. A multi-ratio reversing powershiftable transmission (1) according to claim 1, wherein said fixed drive gear (11) of said set of drive wheels (12) is fixed upon said input shaft (7) which is hollow and is situated concentrically with respect to another input shaft (3).

8. A multi-ratio reversing powershiftable gear (1) as set forth in claim 1 wherein said at least one fixed driven gear (32) is in constant mesh with a first and second idler gears having corresponding first and second clutches wherein activation of one of said first and second clutches engages one of a first and second gears of said multi-ratio reversing powershiftable transmission.

9. A multi-ratio reversing powershiftable transmission (1) comprising:

at least one input shaft (3, 7), having a fixed drive gear (11);

a plurality of countershafts (16, 17, 18, 23, 24 and 25), each supporting a single clutch (19, 20, 21, 29, 31 and 41) and an idler gear (13, 14, 15, 40, 30, 28) which can be optionally non-rotatably connected with one of said countershafts for a change of gear and direction;

a set of drive wheels (12) consisting of said fixed drive gear (11) in constant mesh with more than one of said idler gears;

a set of distribution wheels (35) consisting of a plurality of fixed gears (26, 27, 36, 37, 38 and 39) and one of said idler gears (28) for commutating rotational communication between said countershafts;

a set of driven wheels (34) having a first idler gear (55) in constant mesh with at least a second and third said idler gears (30, 40) for driving an output shaft.

* * * * *